Oct. 12, 1926.

E. F. GERMAIN

FURNITURE JOINT

Filed June 7, 1922

1,602,658

EDWARD F. GERMAIN
INVENTOR

BY

*Geo. B. Willcox* ATTORNEY

Patented Oct. 12, 1926.

1,602,658

UNITED STATES PATENT OFFICE.

EDWARD F. GERMAIN, OF SAGINAW, MICHIGAN, ASSIGNOR TO LOUIS GERMAIN, JR., ALBERT A. GERMAIN, AND JOSEPH HEIDENKAMP, ALL OF PITTSBURGH, PENNSYLVANIA, AND EDWARD F. GERMAIN, OF SAGINAW, MICHIGAN, TRUSTEES.

FURNITURE JOINT.

Application filed June 7, 1922. Serial No. 566,481.

This invention relates to furniture joints and pertains more particularly to joints employed in the construction of closet seats and the like where it is essential that two joined members be held tightly in contact and prevented from separating by warping or otherwise, the fastening means for the joint being entirely concealed.

My present improvement relates to means for fastening such a furniture joint and consists in a tube and two washers, the tube ends expanded to rivet the washers and thereby clamp the members together permanently in a tight grip.

A further object of my improvement is to provide a joint, the application of which can be accomplished at minimum expense and by the use of such ordinary tools as are usually found in a wood-working plant.

With these and certain other objects in view which will appear later in the specification, my invention comprises the devices described and claimed and the equivalents thereof.

In the drawings, Fig. 1 is a part sectional top plan view showing two furniture members secured together by my improved joint, the section being taken on the line 1—1 of Fig. 2.

Figure 2:
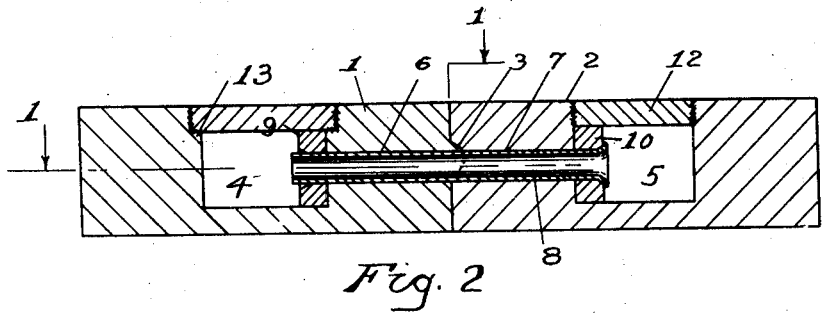
Fig. 2 is a longitudinal section through the tube shown in Fig. 1.
Figure 1:
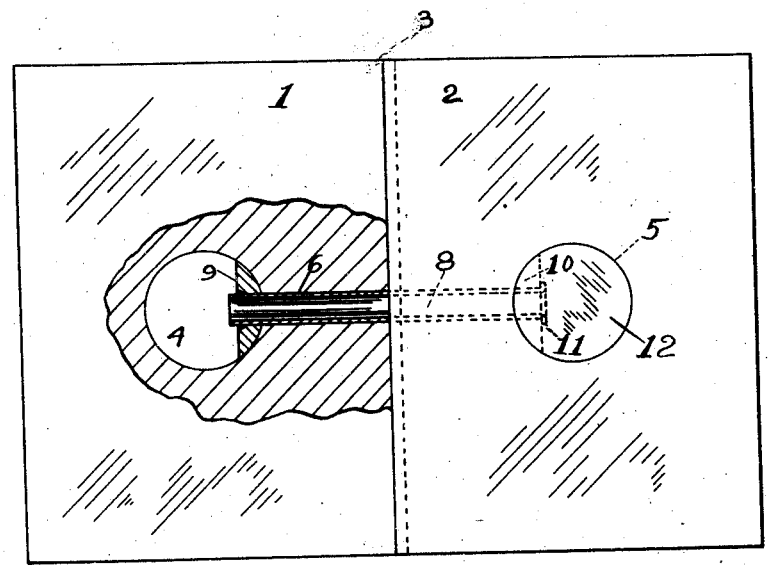
Figure 3:
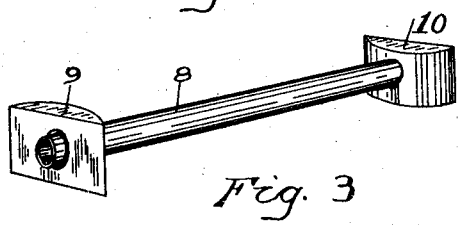
Fig. 3 is a perspective view of the tube and the two washers assembled and before riveting.

As is clearly shown in the drawings, 1 and 2 represent respectively two furniture members to be joined together. They are preferably formed on one face with the usual tongue and groove joint 3.

In applying my improvement, I form a recess, as 4, 5, in each of the members 1 and 2. This recess can be conveniently formed by boring with an ordinary bit. A tubular opening, as 6, 7, is then made from each of the recesses to the face of the member, so that when two members are placed together the openings 6 and 7 will register.

I then insert in one of the openings, as 6, a tube 8 of brass or other suitable material, one end projecting into recess 4. I then place the other member 2 in position, the tube 8 occupying the tubular opening 7 and projecting into the recess 5. An apertured washer, as 9, 10, is then inserted into each recess, the washer slipping over the projecting end of tube 8.

Preferably one face of the washer is curved to fit the wall if its recess.

The washers being assembled in place on the ends of the tube, the tube is then expanded, as shown at 11, being in effect rivetted over upon the outside faces of the washers. In the act of riveting, which may be accomplished by any convenient tool, as a clamp or pair of tongs, the members 1 and 2 are drawn tightly together and are firmly held by the expanded or riveted ends of the tube, so that warping or jamming will not loosen the joint unless the riveted ends of the tube are torn loose from their washers.

After the tube ends have been riveted, the openings 4 and 5 may be filled with any suitable composition, or they may be left unfilled. The surface opening may be closed by means of a circular plug 12 glued in place, the bottom of the plug resting upon the top of the washer, as shown in Fig. 2. The upper part of the opening may be of larger diameter than the lower part of the opening, as shown at the left-hand side of Fig. 2, forming an annular shoulder 13 upon which the plug may take its seat, instead of resting upon the top edge of the washer.

By the means above described, I have produced a simple, inexpensive and effective means for fastening furniture joints and the like, none of the metal parts requiring machine work. The washers may be plain castings and the tube may be a short tubular piece of brass, iron, copper or other material.

The furniture members can be easily and quickly bored by the usual boring tools and methods common in furniture factories, and the tube ends and the washers can be easily and quickly assembled and riveted.

Having thus described my invention, what

I claim and desire to secure by Letters Patent is:

In a furniture joint of the class described having round mortises and apertured washers with curved faces within said mortises, a tube extending through said washers and having its ends expanded by flaring, against the faces of said washers within said mortises after said parts have been assembled, for the purposes set forth.

In testimony whereof, I affix my signature.

EDWARD F. GERMAIN.